United States Patent [19]

Austin et al.

[11] Patent Number: 5,026,587
[45] Date of Patent: Jun. 25, 1991

[54] WIPING FABRIC

[75] Inventors: Jared A. Austin, Greer, S.C.; Joseph H. Miller, Menasha; Robert F. Hyslop, De Pere, both of Wis.

[73] Assignee: The James River Corporation, Richmond, Va.

[21] Appl. No.: 421,463

[22] Filed: Oct. 13, 1989

[51] Int. Cl.⁵ .............................................. B32B 33/00
[52] U.S. Cl. .................................... 428/91; 15/209 R; 422/95; 422/131; 422/137; 422/138; 422/284; 422/297; 422/298; 422/299; 422/913
[58] Field of Search ............... 428/131, 137, 297, 298, 428/299, 91, 95, 913, 138, 284; 28/104, 105; 15/209 R

[56] References Cited

U.S. PATENT DOCUMENTS

| | | | |
|---|---|---|---|
| 1,619,945 | 3/1927 | Leslie | 428/131 |
| 2,862,251 | 12/1958 | Kalwaites | 428/131 |
| 3,033,721 | 5/1962 | Kalwaites | 428/296 |
| 3,255,496 | 6/1966 | Kalwaites | 428/131 |
| 3,345,243 | 10/1967 | Kalwaites | 428/131 |
| 3,485,706 | 12/1969 | Evans | 418/134 |
| 3,485,708 | 12/1969 | Ballou et al. | 428/134 |
| 3,485,709 | 12/1969 | Evans et al. | 428/131 |
| 3,493,462 | 2/1970 | Bunting, Jr. et al. | 161/169 |
| 3,679,535 | 7/1972 | Kalwaites | 428/131 |
| 3,679,536 | 7/1972 | Kalwaites | 428/131 |
| 3,681,182 | 8/1972 | Kalwaites | 428/131 |
| 3,681,183 | 8/1972 | Kalwaites | 428/131 |
| 3,682,756 | 8/1972 | Kalwaites | 428/131 |
| 4,016,317 | 4/1977 | Kalwaites | 428/131 |
| 4,379,799 | 4/1983 | Holmes et al. | 428/131 |
| 4,555,430 | 11/1985 | Mays | 428/131 |
| 4,612,226 | 9/1986 | Kennette et al. | 428/131 |
| 4,775,576 | 10/1988 | Bouchand et al. | 428/216 |

Primary Examiner—James J. Bell
Attorney, Agent, or Firm—Finnegan, Henderson, Farabow, Garrett & Dunner

[57] ABSTRACT

A nonwoven fabric having high performance aqueous fluid retention and wiping characteristics and a method of producing such fabric. The fabric comprises a reinforcing web of self-bonded continuous filament synthetic fibers having at least one surface with spaced clusters of synthetic staple fibers and short natural fibers generally surrounded by void areas having a concentration of synthetic staple fibers and short natural fibers which is lower than such concentration in the clusters. The desired pattern of clusters may be obtained by hydroentanglement using a coarse apertured forming surface.

11 Claims, 2 Drawing Sheets

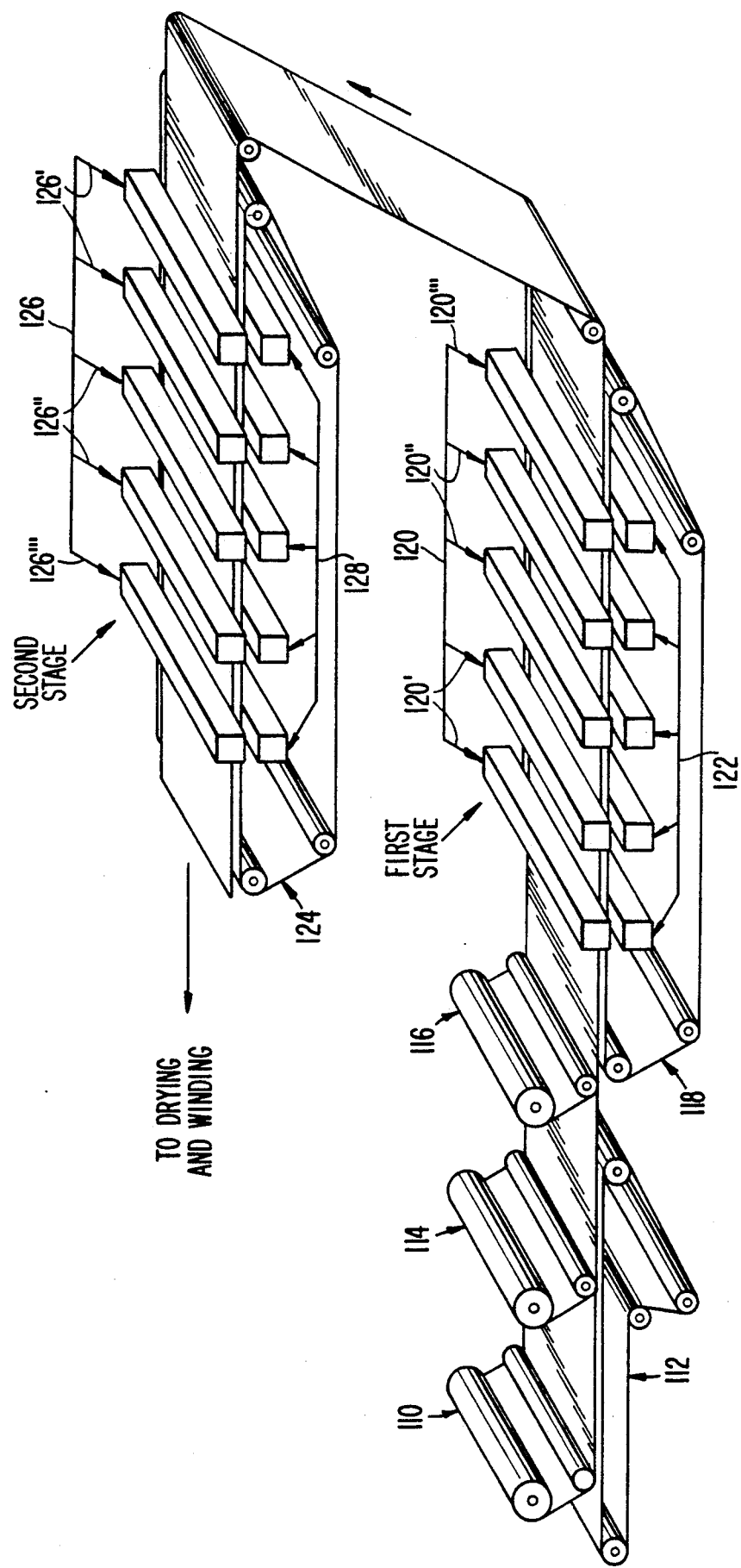

WIPING FABRIC

FIELD OF INVENTION

This invention relates to a nonwoven fabric and a method of manufacturing the same. Particularly, this invention relates to a nonwoven fabric formed of synthetic and wood pulp fibers, which fabric has high performance aqueous fluid retention and wiping characteristics in combination with high strength and durability.

BACKGROUND OF THE INVENTION

It is also known to use a fluid, such as water, to rearrange the fibers of a nonwoven fabric to produce a patterned fabric having on its surface clusters of fibers interconnected to each other. For example, U.S. Pat. No. 3,033,721 discloses the manufacture of patterned nonwoven fabric from a web of natural or synthetic textile-type fibers by directing water onto a sandwich comprised of a spray-diffusing screen belt over the web and an apertured plate underlying the web. The water rearranges the fibers to produce a three-dimensional fabric structure comprising spaced packed fibrous portions of the starting material defining openings arranged in a pattern, and wherein the packed portions are interconnected by consolidated fibers in the form of buds or tufts protruding from the normal plane of the fabric.

U.S. Pat. No. 3,485,706 discloses a nonwoven fabric of randomly inter-entangled fibers in a repeating pattern of localized entangled regions interconnected by fibers extending between entangled regions, which does not use a binder material or the like. The process for making such fabric is described as supporting a layer of fibrous material, e.g., a web, batt, etc. of loose textile staple, paper, etc., fibers, continuous filament, etc., or combination thereof on an apertured patterning member and jetting streams of a liquid supplied at high pressure onto the fibrous material to entangle the fibers and form the fabric. The apertured patterning member may be formed of woven screen or a perforated metal plate, with an open area of from about 10% to 98%. This type process is referred to herein as "hydroentanglement."

U.S. Pat. No. 3,493,462 discloses a non-patterned nonwoven fabric made by supporting a layer of fibrous material on a smooth supporting member and hydroentangling the fibers. The supporting member is, e.g., a relatively smooth screen of sufficiently fine mesh so that the fibers are not rearranged into a pattern dependent on the screen surface. This patent discloses, in Example XIII, a non-patterned, nonwoven fabric of heavy basis weight formed of a tri-laminate having is a center layer of polyethylene terephthalate continuous filament and two outer layers each a web of 70% rayon/30% wood pulp fibers. This trilaminate has substantially no clusters of fiber segments.

Hagy and Austin, in U.S. Pat. No. 4,775,576 disclose an absorbent elastic nonwoven fabric made of staple textile fibers and/or wood pulp hydroentangled with an elastic web of a thermoplastic elastic polymer. This fabric is non-patterned and does not have spaced clusters of fibers. While such fabric is very satisfactory for use as elastic bandage or the like, it does not have the level of absorbency required for a high performance wipe.

We, however, are not aware of a nonwoven fabric having high performance wiping and fluid retention properties combined with high strength and durability, which is suitable for wiping aqueous films from surfaces. Such a fabric is desirable for domestic and commercial uses as a general purpose wiping cloth. In seeking such a fabric, after a considerable development effort, we have arrived at the novel fabric of the present invention.

SUMMARY OF THE INVENTION

A general object of the present invention is a fabric having superior aqueous fluid retention and wiping characteristics, while at the same time having the strength and durability required for use over an extended period of time. An additional object is a process for producing such a fabric which is economical and uncomplicated. Other objects and advantages of the present invention will become apparent to those skilled in the art from the following description and practice of the invention.

The objects of the present invention are achieved by a nonwoven fabric having high performance aqueous fluid retention and wiping characteristics, the fabric comprising a reinforcing web formed of an interconnecting network of continuous filament synthetic fibers; and a mixture of synthetic textile staple fibers and short natural fibers interentangled and entangled with the continuous filament fibers so as to form a strong, cohesive structure; at least one surface of the fabric having a plurality of spaced apart clusters of the synthetic staple fibers and short natural fibers, the clusters being generally surrounded by areas having a concentration of synthetic staple fibers and short natural fibers which is lower than such concentration in the clusters. The short natural fibers are generally papermaking fibers obtained from wood pulp, cotton linters, and the like.

The present invention also provides a method for forming a nonwoven fabric having high performance aqueous fluid retention and wiping characteristics. Three preferred embodiments of such method are described herein, each for making a different type of the nonwoven fabric of the present invention.

The first embodiment (Method I) comprises supporting a nonwoven surface web formed of synthetic textile staple fibers and short natural fibers on a reinforcing nonwoven fabric of self-bonded continuous filament synthetic fibers having a basis weight of at least 0.2 ounces per square yard. The reinforcing fabric and surface web structure are then supported on an apertured forming member having spaced-apart openings therein, the surface web structure being supported on a first surface of the reinforcing fabric opposite a second surface thereof adjacent the forming member, the apertured forming member having from about 30 to about 5 openings per inch to provide a total of from about 20% to about 70% open area in the forming member. Then, liquid is jetted at high pressure onto the surface web so as to cause the textile staple fibers and the short natural fibers to become interentangled and to also become entangled with the filaments of said reinforcing fabric, while causing the textile staple fibers and the short natural fibers to move to the openings and form spaced apart clusters thereof having a high concentration of short natural fibers in the openings.

The second embodiment, Method II, for forming the nonwoven fabric builds on the first method. In this second method a second nonwoven surface web formed of synthetic textile staple fibers and short natural fibers is placed on top of the fabric produced by the first method adjacent to the fabric side which is rich in the continuous filament reinforcing fibers, i.e., opposite the side previously subject to jetting. This combination of web and fabric is then placed on top of an apertured forming member, the short natural fiber rich side of the fabric formed by the first method being adjacent the forming member. The apertured forming member has from about 30 to about 5 openings per inch to provide a total of from about 20% to about 70% open area in the forming member. Liquid is jetted at high pressure onto the surface of the second nonwoven surface web causing the textile staple fibers and the short natural fibers to become intertangled and to also become intertangled with the filaments of said reinforcing fabric, while causing the textile staple fibers and the short natural fibers to move to the openings and form spaced apart clusters thereof having a high concentration of short natural fibers in the openings. Using this method, it is possible to form different cluster patterns on the two sides of the fabric. The first pattern is produced during the first application of jetted liquid and is determined by the pattern of the openings in the first forming member. The second pattern is produced during the second application of jetted liquid and is determined by the pattern of openings in the second forming member.

A third method, Method III, is also provided for forming the fabric of the present invention. In this method a reinforcing fabric of self-bonded continuous filaments having a basis weight of at least 0.2 ounces per square yard is placed on top of a nonwoven surface web formed of synthetic staple textile fibers and short natural fibers. A second nonwoven surface web formed of synthetic staple textile fibers and short natural fibers is then placed on top of the reinforcing fabric of self-bonded continuous filaments on the side opposite the first surface web. These three fibrous layers are then placed on a first relatively smooth forming member having very small spaced apart openings, the surface of one of the nonwoven webs being adjacent to the forming member surface. This first forming member is relatively smooth and has at least 30 openings per inch with no more than 25% open area. Liquid at high pressure is jetted onto the surface of the first nonwoven surface web opposite, or away from, the forming member surface. The textile staple fibers and short natural fibers of both nonwoven webs become intertangled among themselves and also with the filaments of the reinforcing fabric. However, because of the small size of the apertures in this forming member, there are no readily visible fiber clusters formed during this step.

After this first application of high pressure water jets, the product fabric is then transferred to a second forming member so that a second side of the fabric which was adjacent to the first forming member is now opposite, or away from, the second forming member. This second forming member has spaced apart openings therein, of from about 30 to about 5 openings per inch to provide a total of from about 20% to about 70% open area in the forming member. Jets of high pressure liquid are jetted onto the second side of the fabric, causing the textile staple fibers and the short natural fibers to move to the areas of the openings and form spaced apart clusters which have a high concentration of wood pulp fibers. This third method gives a fabric with a pronounced two-textured effect, one side being relatively smooth and the other side having spaced apart clusters of fibers.

BRIEF DESCRIPTION OF THE DRAWINGS

The present invention is described hereinbelow in more detail with reference to accompanying drawing wherein:

FIG. 4 schematically illustrates equipment used in making a preferred embodiment of the fabric of the present invention.

DESCRIPTION OF PREFERRED EMBODIMENTS

The novel wiping fabric of the present invention comprises a nonwoven reinforcing fabric of continuous filament synthetic fibers which has at least one planar surface, and preferably both planar surfaces, supporting a nonwoven surface web formed of a mixture of synthetic textile staple fibers and short natural fibers which has been hydroentangled on an apertured forming surface which permits the formation of spaced apart clusters, or buds, on the surface of the wiping fabric. Due to the hydroentanglement, the short natural fibers are concentrated in the buds to make the fabric more absorbent than a comparable fabric with no bud structure. The buds also contain other fiber components, but contain short natural fibers in a higher percentage than these other components. The superior fluid retention capability of this novel fabric is accounted for by the high concentration of short natural fibers in the buds.

Figure 1A:
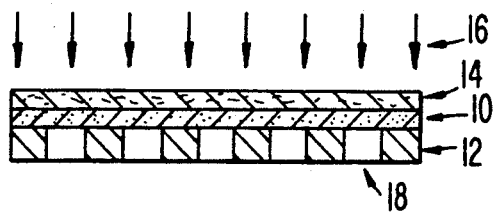
FIG. 1A is a side view illustrative of Method I for making a first embodiment of the fabric of the present invention.
Figure 1B:
FIG. 1B is a cross-sectional view of the fabric produced by Method I.

As referred to above, three methods are provided for forming various embodiments of the fabric of the present invention. The first method (Method I) is described with reference to FIG. 1A. The nonwoven reinforcing web 10 of continuous filament synthetic fiber is supported on a relatively course apertured forming surface 12, and surface web 14 of synthetic staple fibers and short natural fibers is supported on the upper surface of reinforcing web 10. The upper surface of surface web 14 is then traversed by high velocity streams of water 16 jetted under high pressure, e.g., from about 200 to 1600 psig, to hydroentangle the fibers of surface web 14 and the filaments of the reinforcing web 10. As a result of the hydroentangling, staple synthetic fibers and the short natural fibers are moved laterally and vertically from their original positions toward the apertures 18 of the forming member 12 to form a pattern of spaced apart clusters, or buds, on the surface of the fabric, which pattern is determined by the pattern of openings in the forming surface 12. The final fabric, shown in FIG. 1B, comprises surface web 14 hydroentangled with the reinforcing web 10. One surface of this fabric opposite the surface subjected to hydroentangling has a pattern formed by buds 22 generally surrounded by voids 24 which have a concentration of staple synthetic fibers and short natural fibers lower than that in the buds.

Figure 2A:
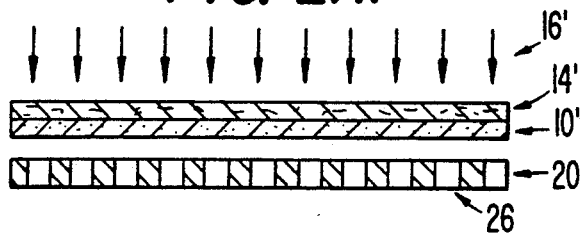
FIG. 2A is a side view illustrative of the first step of Method II for making a second embodiment of the fabric of the present invention.

A second method, Method II, for forming the fabric of the present invention is described with reference to FIGS. 2A and 2B. The nonwoven reinforcing web 10 of continuous filament synthetic fiber is supported on a relatively course apertured forming surface 20 and a first surface web 14 of synthetic staple fibers and wood pulp fibers is supported on the upper surface of reinforcing web 10'. The upper surface of surface web 14' is the traversed by high velocity streams of water 16' jetted under high pressure, e.g., from about 200 to 1600 psig, to hydroentangle the fibers of the first surface web 14' and the filaments of the reinforcing web 10'. As a result of the hydroentangling, staple synthetic fibers and the short natural fibers are moved laterally and vertically from their original positions toward the apertures 26 of the forming member 20 to form a pattern of spaced clusters, or buds, on the surface of the fabric.

Figure 2B:
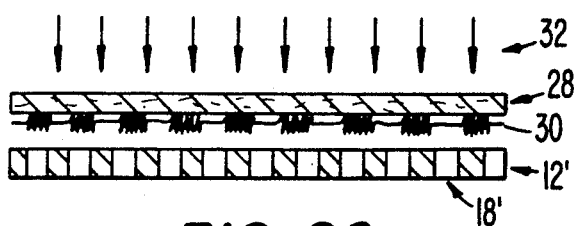
FIG. 2B is a side view illustrative of the second step of Method II of the present invention.
Figure 2C:
FIG. 2C is a cross section of the second embodiment of the fabric produced by Method II.

The second step of Method II is depicted in FIG. 2B. The fabric 30 from the first step is supported on a second relatively course apertured forming surface 12'. The side of the fabric which was adjacent to first forming surface 20 in the first step being opposite, or away from, the forming surface 12' in the second step. A second surface web 28 of synthetic staple fibers and short natural fibers is supported on the upper surface of fabric 30. The upper surface of surface web 28 is then traversed with high velocity streams of water 32 jetted under high pressure to hydroentangle the fibers of the surface web 28 and the fibers and filaments of fabric 30. As a result of the hydroentangling, staple synthetic fibers and wood pulp fibers are moved laterally and vertically from their original positions toward the apertures 18, of the forming member 12' to form spaced apart clusters, or buds, on the surface of the fabric. The resulting fabric, described in FIG. 2C, has a pattern of spaced buds on its two surfaces, the patterns being determined by the spacing of the apertures in the forming surfaces 20 and 12'.

A third method (Method III) for forming a third embodiment of the fabric of the present invention is described with reference to FIGS. 3A and 3B.

Figure 3A:
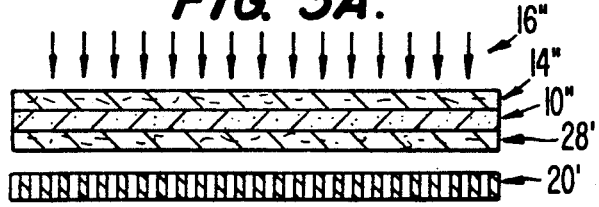
FIG. 3A is a side view illustrative of the first step in Method III for making a third embodiment of the fabric of the present invention.

In the first step, depicted in FIG. 3A, the nonwoven reinforcing web 10'' of continuous filament synthetic fiber is placed between two nonwoven webs 14'' and 28'' formed of synthetic staple fibers and short natural fibers. These three layers are placed on forming member 20, which may be, for example, a smooth, tightly woven screen, more tightly woven than 50/mesh, or another similar relatively smooth surface with apertures smaller than 0.02'' in diameter. These three layers of webs are then traversed by high velocity water streams 16'' jetted under high pressure, to hydroentangle the fibers of the three webs 14'', 10'', and 28'. Because of the close spacing and small diameter of the apertures in the forming surface, noticeable clusters, or buds, of fibers are not formed on the surface of the fabric produced by the first step. Therefore, one surface of the fabric produced in this step can have a texture similar to that of a woven fabric.

Figure 3B:
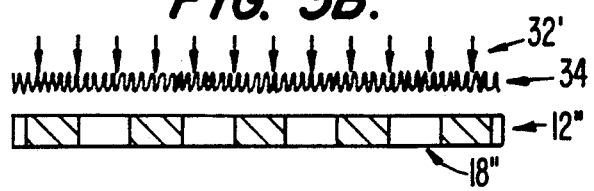
FIG. 3B is a side view illustrative of the second step in Method III of the present invention.
Figure 3C:
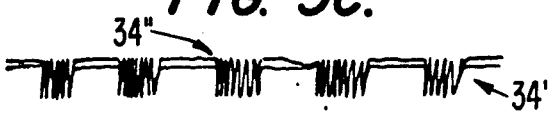
FIG. 3C is a cross section of the fabric produced by method III.

The second step of Method III is depicted in FIG. 3B. The fabric 34 from the first step is supported on a second apertured forming surface 12'', the side of the fabric which was adjacent to forming surface 20' in the first step being opposite, or away from, the forming surface 12'' in the second step. The upper surface of fabric 34 is then traversed with high velocity streams of water 32' jetted under high pressure to further hydroentangle the fibers of the fabric and to move the staple synthetic fibers and the short natural fibers laterally and vertically from their original positions toward the apertures 18'' of the forming member 12'' to form spaced clusters, or buds, on the surface fabric opposite the apertures 18'''. The final fabric, shown in FIG. 3C, has two distinctly different patterns on its two surfaces. One surface 34' is covered with spaced buds, the pattern of the buds being determined by the pattern of the apertures in forming member 12''. The other surface 34'', while being apertured, has a smoother texture, and the roughness of the bud pattern is not as apparent when this surface of the fabric is touched.

Due to the movement of the staple synthetic fibers and the short natural fibers during the hydroentanglement step, the areas surrounding the buds are less concentrated in these fibers, particularly the short natural fibers, and are referred to as "voids". For removing large volumes of water from surfaces, the voids serve as initial containment structures. The voids also serve to trap debris during wiping. The water from the voids is subsequently wicked into the buds. The tightly packed fibers in the buds create a network of tight capillaries which imbibe water and hold it tightly.

The short natural fibers in the buds provide a very absorptive surface for wiping aqueous films from surfaces, providing, good "wipe dry" characteristics. The interconnecting synthetic fibers, being lower in weight than the buds provide the fabric with increased flexibility in both directions compared to a fabric of more uniform distribution of weight and fiber types. The reinforcing web strengthens the overall structure, bringing its strength to a level far greater than could be attained with comparable fabrics not containing such a reinforcing web. The use of a "spunbonded" or self-bonded reinforcing fabric enables a high percentage of short natural fibers, approximately 40% to 70% of the overall weight of the wipe, to be used in the fabric, leading to its superior absorbency performance. The use of a spunbonded reinforcing web also provides sufficient strength so that binder resins are not necessary.

THE REINFORCING FABRIC

Preferably, a spunbonded nonwoven fabric is used as the reinforcing fabric. As used herein, the term "spunbonded" refers to a fabric prepared by continuously extruding a suitable thermoplastic polymer, such as a polyamide, polyethylene teraphthalate, polyolefin or the like through a spinneret in order to form discrete filaments, mechanically or pneumatically drawing the filaments without breaking to molecularly orient the polymer and to achieve tenacity. The continuous filaments are then deposited on a carrier belt to form a web of substantially continuous and randomly arranged, molecularly oriented filaments and are bonded. In such spunbonded fabrics, the filaments are bonded to adjacent filaments without the aid of a binder resin, and are often referred to as "self-bonded" fabrics. It is preferred that the spun-bonded fabric is lightly bonded so that the filaments are more free to move during the hydroentangling step.

The preferred nonwoven, reinforcing web for use in the present invention is a spunbonded, or self-bonded, nonwoven web, or fabric, formed of continuous filaments spun from a molten polyamide resin, or nylon, such as nylon 66, in a continuous operation and pneumatically attenuated prior to deposition in a random pattern onto the surface of a conveyor belt to form a coherent, uniform web. A chemically activating gas is then absorbed onto the surface of the filaments and calendering may be employed to increase the contact between filaments at their intersections. After desorption of the activating gas in both or by heat, a strong bond is left between intersecting filaments. Such a method of forming a self-bonded nonwoven fabric and the fabric are more fully described in U.S. Pat. No. 3,542,615, which is incorporated hereinto by reference and forms a part hereof.

Another type of such reinforcing fabric which may be used in the present invention is a web of continuous filaments of a thermoplastic polymer formed by spinning filaments into a quench chamber where they are contacted with a quench fluid utilized to draw the filaments through a continuous narrow nozzle to produce a linear plane of filaments which are randomly laid down on an endless belt or screen. The resulting filaments are intertwined and form a coherent web which may be subjected to compacting and bonding. Such webs and their manufacture are more fully described in U.S. Pat. No., 4,405,297, which is incorporated herein by reference and forms a part hereof.

Still another type of such nonwoven reinforcing fabric suitable for use in the present invention is formed using electrostatic charging of continuous synthetic organic filaments under tension to produce a nonwoven web of randomly distributed interentwined continuous filaments. Such webs may be produced by the process described in U.S. Pat. No. 3,338,992 which is incorporated by reference herein and forms a part hereof.

Yet another type of nonwoven reinforcing fabric suitable for use in the present invention is formed of non-parallel continuous synthetic organic filaments randomly distributed throughout the web and separated from each other except at filament intersections, as described in U.S. Pat. No. 3,341,394, which is incorporated herein by reference and forms a part hereof.

THE SURFACE WEB

The surface web may be produced by a conventional dry or wet method. Any one of the various, commonly practiced dispersant techniques may be used to disperse a uniform furnish of short natural fibers and staple fibers onto a foraminous screen of a conventional papermaking machine. U.S. Pat. No., 4,081,319 to Conway and U.S. Pat. No. 4,200,488 to Brandon et al. disclose wetlaying methods which may be used to produce a uniform web of wood pulp and staple fibers. A preferred method of dispersing a mixture of staple fibers and wood pulp in an aqueous furnish is disclosed in commonly assigned copending U.S. Patent application Ser. No. 035,059, filed Apr. 6, 1987. A suitable method for producing a dry laid web is disclosed in U.S. Pat. No. 4,193,751.

The short natural fibers used in preparing the above surface web should be long, thin and flexible, since as will be understood from the following description, such fibers will more readily become entangled with the synthetic fibers. Most preferably, wood fibers obtained from Northern softwoods such as or red wood, Western red cedar or Eastern white pine are used as source of the short natural fiber. However, cotton linters or other papermaking fibers can also be used.

The amount of short natural fiber in the surface web may vary from about 15% to about 70%, by weight, of the total weight of the final fabric, but preferably from about 40% to 70% is used.

The staple synthetic fibers may of any suitable material such as polyamide, polyester, polyacrylonitrile or polyolefin resins or rayon. Preferably, the length of such fibers is between 0.375 and 1 inch, and the denier is between 0.7 and 5 d.p.f.

The amount of staple synthetic fibers in the surface web may vary between about 25% and 75%, by weight, of the total weight of final fabric and, preferably, is between about 25% and 40%, by weight, of the final fabric.

FORMING THE FINAL FABRIC

Each of the three methods described above may be used for forming the final wiping fabric of the present invention. In Method I a first layer of the surface web formed of short natural fibers and staple synthetic fibers is supported on a first planar surface of a nonwoven reinforcing web, and the second surface of the reinforcing web, opposite the first surface, is supported on an apertured forming surface.

In Method I the forming surface is relatively coarse and has from about 20% to about 70% open area. If formed of metal wire, it has from about 3 to about 30 wires/inch and the wire diameter can vary from 0.005" to 0.05". Most preferably, a 9×10 mesh wire screen formed of 0.035" diameter wire and having an open area of about 50% is used. Then, the above two layers are subjected to a first hydroentanglement treatment, by jetting a liquid, such as water, onto the surface web side to produce a fabric which is patterned on one side.

In Method II of the present invention, a second surface web of short natural fibers and staple synthetic fibers is placed on top of the fabric formed by Method I. The second surface web is placed adjacent the continuous filament reinforcing side of the fabric formed by method I. The combined layers are then subjected to a second hydroentanglement treatment by jetting liquid onto the second surface web side to produce a fabric which is patterned on both sides.

In the third method (Method III), hereinafter described in more detail, two hydroentanglement steps are employed. The forming surface used in the first hydroentanglement step is a relatively smooth surface, for example, 100 mesh or finer wire screen. This provides a preliminary strengthening of the fabric which has a substantially flat non-patterned first surface. Subsequently, when the fabric is subjected to the second hydroentanglement step, a second forming surface having the above relatively coarse and open forming surface is employed to give the second surface of the fabric opposite the first surface, the desired textured, or coarse, pattern.

The texture and spacing of the apertures of the forming surface directly affect the texture and spacing of the buds of the present fabric. Hence, the forming surface chosen for at least the second hydroentanglement step of this invention may be a woven screen, a perforated metal cylinder or other suitable surface which will result in a bud spacing of from about 0.03" to about 0.20", preferably about 0.10". The perforated metal cylinder may have a regular pattern of protrusions which assist in the formation of the buds during the hydroentanglement step. If a woven screen is used as the forming surface, it should be more open than 22×24 mesh and have an open area of at least 20%.

Various weaves may be selected for the woven screen according to the fabric pattern desired, and a rough weaves may be used to better assist in forming the buds. Woven screens suitable for forming the products of this invention are described in the article "Forming Wires for Hydroentanglement systems," *Nonwovens Industry* 1988, PP 39–43; Widen, C. B. Perforated cylinders suitable for this invention are disclosed in U.S. Pat. No. 4,704,112 to Suzuki et al.

A preferred method of making a preferred embodiment of the unique fabric of this invention is described hereinbelow with reference to FIG. 4.

In accordance with the preferred method for manufacturing the fabric of this invention, a roll of wet lay nonwoven 110 is unwound onto transfer belt 112. A roll of Cerex spunbonded 114 is unwound on top of the wet lay nonwoven. A second roll of wet lay nonwoven 116 is unwound on top of the spunbonded. This forms a three-layer structure, the two outer wet lay nonwovens each constituting a surface web and a middle monofilament nonwoven, the reinforcing web. The transfer belt 112 carries the three layers of nonwoven to the forming wire 118 of the first hydroentanglement stage. The first hydroentanglement stage provides a preliminary strengthening of the fabric. The forming wire in this stage is preferably 100 mesh or finer. When the forming wire is run at 65 feet per minute the water pressures used in the hydroentanglement manifolds 120 are: two manifolds 120, at 400 psi, two manifolds 120" at 800 psi, and one manifold 120''' at 1,000 psi. The water jet orifices in the manifolds are spaced 0.025" apart and have a diameter of 0.005". After the water jets pass through the fiber webs and the forming wire they pass into suction boxes 122 from which the water is pumped into a filtration system.

After the first strengthening stage the fabric is transferred to a second hydroentanglement stage which is outfitted with a relatively open forming wire 124. The preferred wire is a 9×10 mesh screen woven from the polyester monofilament. It is in this second stage that the agglomeration of the short natural fibers into the tufts occurs. When this second wire is run at 65 feet per minute the hydroentanglement conditions in this second stage are two manifolds 126' at 800 psi, two manifolds 126" at 1,000 psi, and one manifold 126''' at 1,200 psi. The manifolds 126 are outfitted with orifices 0.005" in diameter and spaced 0.025" apart. In this second stage, the water jets penetrate the fabric on the side opposite the side which was penetrated by the water jets in the first stage. After the water jets pass through the fabric and the forming wire they pass into suction boxes 128 from which the water is pumped into a filtration system. The wet fabric is removed from the second hydroentanglement stage and is carried into a through air drying oven (not shown). The fabric is wound up after is exists the oven.

The preferred composition of the wet laid nonwoven components is 60% bleached Northern softwood kraft wood fibers and 40% 1.5 denier polyester staple, 0.75" in length. The preferred basis weight of the wet lay nonwoven is 1.1 ounces per square yard.

The preferred spunbonded component is T-29 Cerex of basis weight 0.3 ounces per square yard. Cerex is manufactured by the James River Corporation, Richmond, Virginia. The T-29 grade of Cerex is lightly bonded by hydrogen chloride gas.

The following comparative test data, shown in Table I, illustrate the superior qualities of the fabric made by Method III of the present invention ("A") relative to a commercial premium food service wipe ("B") and to a regular grade food service wipe ("C").

TABLE I

| WIPE PERFORMANCE CHARACTERISTICS | | | |
|---|---|---|---|
| | "A" | "B" | "C" |
| Basis Weight (Les./Ream) | 53.4 | 48.2 | 44.8 |
| Thickness Dry (Inches/1000): | 27.7 | 27.6 | 21.1 |
| Wet | 27.7 | 26.5 | 20.4 |
| Strength | | | |
| Grab Tensile MD Dry (lbs.) | | | |
| MDD | 34.6 | 18.0 | 19.3 |
| CDD | 22.5 | 15.4 | 16.8 |
| MDW | 22.2 | 11.1 | 8.9 |
| CDW | 16.3 | 9.8 | 7.9 |
| Elmendorf Tear MD Dry (g) | | | |
| MDD | 1,302 | 668 | 754 |
| CDD | 1,954 | 962 | 1,300 |
| MDW | 2,447 | 516 | 410 |
| CDW | 2,012 | 686 | 577 |
| Absorbency | | | |
| Water Absorbency Rate (sec./0.1 ml) | 0.25 | 0.23 | 0.28 |
| Water Absorbent Capacity (g/sq. m) | 552.4 | 412.7 | 455.8 |
| Wicking Rate MD (cm/min) | 8.4 | 6.1 | 6.9 |
| CD | 6.9 | 5.2 | 5.9 |
| Wipe Dry Time (seconds) | 70.8 | 153.7 | 63.0 |

"B" is a premium food service wipe. "C" is a regular grade food service wipe. "A" is a fabric in accordance with the present invention, made with Cerex (produced by The James river Corporation), a nylon 66 spin-bonded nonwoven fabric, as the reinforcing web, and a 70% wood pulp - 30% PET staple fiber surface web hydroentangled on each side of the reinforcing web.
MDD - Machine Direction Dry
MDW - Machine Direction Wet
CDD - Cross Direction Dry
CDW - Cross Direction Wet As referred to hereinabove, both the fiber materials forming the present fabric and the structure of the fabric itself significantly affect the properties, e.g., absorbency and strength; of the fabric, and these factors are critical to achieving the superior qualities of the fabric.

To demonstrate the effect of the variation in raw material composition on the performance of wiping fabrics, a series of tests were conducted on the fabrics indicated in Table II below. These fabrics were tested for basis weight, machine direction (MD) wet and dry tensile strength, cross direction (CD) wet and dry tensile strength, caliper and percentage absorbent capacity. The reinforcing web used for these fabrics are 2.7 osy (53.5 lb/ream) CEREX ® (T-29), a spun bonded nonwoven continuous filament fabric manufactured by The James river Corporation. The surface webs were wetlaid, and the synthetic staple fibers were polyethylene terephthalate (PET) having an average length of 0.75" and a denier of 1.5, while the short natural fibers were Northern softwood kraft wood fibers. These fabrics were prepared by Method III described previously. The fabrics were formed as described above, using a 9×10 mesh wire screen forming surface, by hydrentangling a surface web as described above on each side of the reinforcing web.

To determine if variations in the size and spacing of the buds on the performance characteristic of the above fabrics, a number of fabrics were made, as described above, using a CEREX ® T-29 reinforcing web having on each side a hydroentangled surface Web formed of the previous PET staple fibers and Northern softwood kraft wood fibers. These fabrics were tested as described above, and the test results are shown in TABLE III below.

TABLE II

EFFECT OF COMPOSITION ON PERFORMANCE OF HIGH ABSORBANCY WIPE

|  | Cerex + 60/40 Pulp/PET | Cerex + 80/20 Pulp/PET | Cerex + 20/80 Pulp/PET | Cerex + 100% PET | 60/40 Pulp/PET | 100% PET | Cerex + 50/50 Pulp/PET | Cerex 70/30 Pulp/PET |
|---|---|---|---|---|---|---|---|---|
| Weight Ounces/Yd² | 2.75 | 2.85 | 2.25 | 2.05 | 2.79 | 1.35 | 2.49 | 2.78 |
| Caliper, Mils | 57 | 68 | 48 | 50 | 49 | 34 | 39 | — |
| Strip Tensile Lbs/In |  |  |  |  |  |  |  |  |
| MDD | 10.5 | 7.1 | 11.9 | 15.7 | 7.1 | 11.0 | 9.6 | 9.4 |
| CDD | 7.0 | 2.7 | 5.5 | 7.3 | 4.5 | 5.0 | 4.8 | 4.9 |
| MDW | 5.8 | 4.6 | 14.0 | 15.9 | 3.0 | 11.0 | — | — |
| CDW | 4.7 | 1.9 | 5.5 | 7.1 | 2.0 | 5.3 | — | — |
| Absorbent % Capacity | 925 | 873 | 907 | 251 | 923 | 473 | 944 | 856 |

TABLE III

EFFECT OF FORMING SCREEN MESH SIZE ON PERFORMANCE OF HIGH ABSORBENCY WIPE

| FORMING SCREEN | CEREX + 60/40 PULP/PET 100 MESH | CEREX + 60/40 PULP/PET 13 × 20 MESH | CEREX + 60/40 PULP/PET 22 × 24 MESH | CEREX + 60/40 PULP/PET 9 × 10 MESH | CEREX + 60/40 PULP/PET 25 × 31 MESH |
|---|---|---|---|---|---|
| Weight Ounces/Yd² | 2.75 | 2.83 | 2.72 | 2.75 | 2.69 |
| Caliper, Mils | 31 | 49 | 48 | 57 | — |
| Strip Tensile Lbs/In |  |  |  |  |  |
| MDD | 17.4 | 13.0 | 16.8 | 10.5 | 11.0 |
| CDD | 9.1 | 8.1 | 9.5 | 7.0 | 8.6 |
| MDW | 9.3 | 8.7 | — | 5.8 | — |
| CDW | 6.9 | 7.0 | — | 4.7 | — |
| Absorbent % Capacity | 732 | 930 | 859 | 925 | 842 |

In order to attain a wiping fabric having the desired combination of strength and absorbency, as seen from the above data, it is desirable that the nonwoven continuous filament reinforcing web have a weight basis of at least 0.2 osy, that the surface web be formed of synthetic staple fibers and short natural fibers in a ratio of from about 1:4 to about 4:1, and that the forming surface employed in at least the second hydroentanglement step have from about 5 to about 30 holes per inch, with an open area of from about 20% to about 70% to provide a fabric at least one side of which has a pattern of buds spaced at from about 0.03" to about 0.20".

Having described our invention, it is to be understood that variations and modifications thereof will become apparent to those skilled in the art, and, as such, fall within the scope of the appended claims and their equivalents.

What is claimed is:

1. A nonwoven textile fabric having high performance aqueous fluid retention and wiping characteristics, said fabric comprising:
    (a) a reinforcing web formed of an interconnecting network of continuous filament synthetic fibers; and
    (b) a mixture of synthetic textile staple fibers and short natural fibers interentangled and entangled with said continuous filament fibers so as to form a cohesive structure;
    (c) at least one surface of said fabric having a plurality of spaced apart clusters of said synthetic staple fibers and short natural fibers, said clusters being generally surrounded and interconnected by areas having a concentration of synthetic staple fibers and short natural fibers which is lower than such concentration in said clusters.

2. The fabric of claim 1, wherein said reinforcing web has a basis weight of at least about 0.2 ounces per square yard.

3. The fabric of claim 1 wherein said synthetic staple fibers are present in an amount of from about 25 to 75%, by weight, of the total weight of said fabric.

4. The fabric of claim 1, wherein the denier of said synthetic staple fibers is from about 0.7 to about 5 and the length thereof is from about 0.375 to about 1 inch.

5. The fabric of claim 1, wherein said synthetic staple fibers are formed of a material selected from the group consisting of polyester, polypropylene, nylon, and polyacrylonitrile resins and rayon.

6. The fabric of claim 1, wherein said short natural fibers are present in an amount of from about 15 to 70%, by weight, of the total weight of said fabric.

7. The fabric of claim 1, wherein said short natural fibers have an average fiber length of from about 3 to 6 millimeters.

8. The fabric of claim 7, wherein said short natural fibers are obtained from redwood, western red cedar or eastern white pine.

9. The fabric of claim 7, wherein said short natural fibers are obtained from cotton linters.

10. The fabric of claim 1, wherein said clusters are periodically spaced at an average distance of from about 0.03 to about 0.20 inch.

11. The fabric of claim 1, wherein the surface of said fabric opposite said one surface is substantially flat.

* * * * *